April 17, 1951   J. C. PINTAK   2,549,003
WHEEL ATTACHMENT FOR SLEDS
Filed April 8, 1949
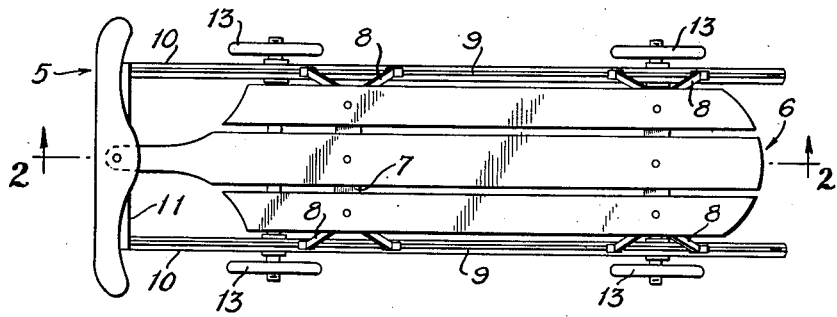
Fig. 1.
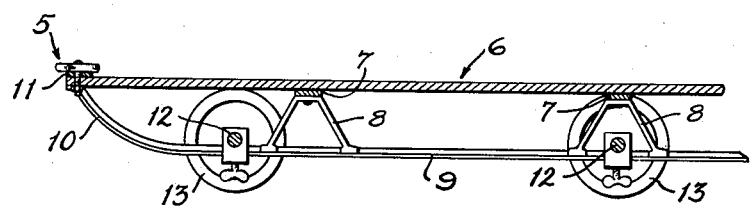
Fig. 2.
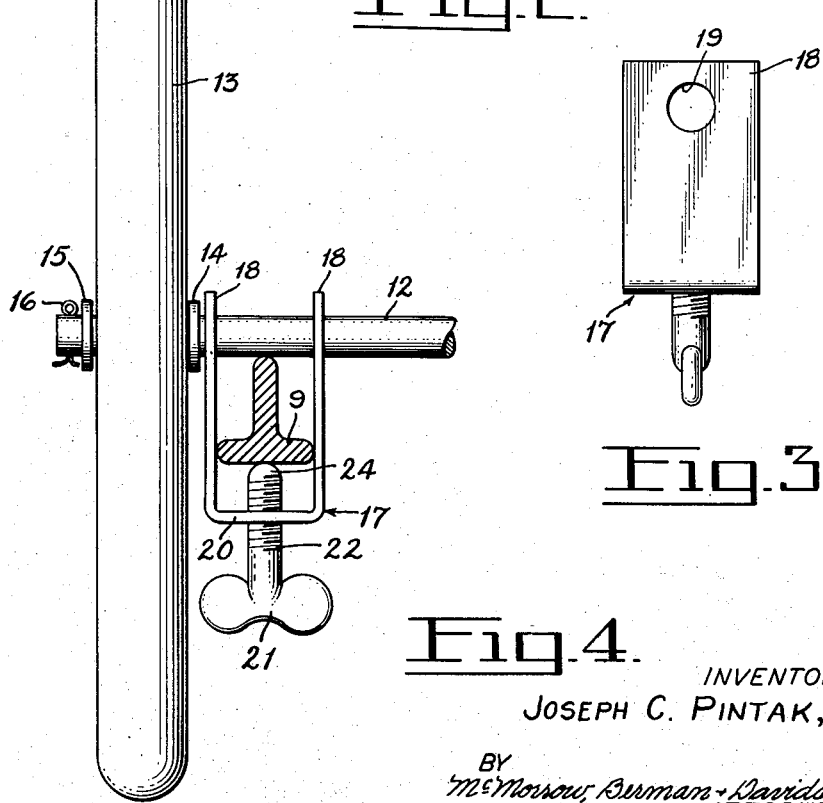
Fig. 3.
Fig. 4.
INVENTOR
JOSEPH C. PINTAK,
BY
McMorrow, Berman & Davidson
ATTORNEYS Patented Apr. 17, 1951

2,549,003

UNITED STATES PATENT OFFICE 2,549,003

WHEEL ATTACHMENT FOR SLEDS

Joseph C. Pintak, Fairview, N. J.

Application April 8, 1949, Serial No. 86,359

2 Claims. (Cl. 280—8)

This invention relates to attachments to sleds and the like serving to convert them to travel upon rollers or wheels.

The main object of my invention is to provide a sled or the like with means for traveling on the ground, like a cart, wagon or other wheel-equipped object of this class, and particularly to enable the sled to travel in summertime in the same manner over the same ground as in winter upon the snow.

Another object is to provide a sled with wheel attachments to convert the sleds into wheeled vehicles.

A further object is to provide attachments of the character indicated which may be individually attached to the runners of a sled at selected points thereon to provide for maximum strength and stability of structure and including a transverse shaft common to two attachments arranged in a pair at each end of the sled.

It is also an object to have wheel attachments which are readily attached, light in construction, yet effective and reasonably durable in operation.

Other objects and advantages of the invention will appear in further detail as the specification proceeds.

In order to facilitate ready comprehension of this invention for a proper appreciation of the salient features thereof, the invention is illustrated on the accompanying drawing forming a part hereof, and in which:

Figure 1 is a plan view of a sled equipped with wheel attachments according to the present invention which embody the same in a practical form;

Figure 2 is a longitdinal section taken on line 2—2 in Figure 1;

Figure 3 is a side elevation of one of the brackets by which the wheel axles are attached to the runners of the sled, the bracket being shown on an enlarged scale;

Figure 4 is an enlarged fragmentary section through one of the runners with a portion of one of the axles shown assembled therewith and the bracket of Figure 3 in place and a wheel mounted on the axle exteriorly of the runner.

In the views, the same reference numerals indicate the same or like parts.

In many sections of the country the snowfall is fitful and unreliable in winter and does not last very long upon the ground, so that children and others who desire to use sleds find that the use of the latter is rather limited in time, with the result that sleds are useless during the rest of the year, and in fact, most of the time, as they depend entirely for their usefulness upon the presence of snow and ice on the ground, and particularly on hillsides. This condition has appealed to me as a problem which has apparently not been solved by anything generally adopted to the present, and hence it has occurred to me that means should be available to attach to a sled in order to make the same as useful when snow is absent as when snow is actually lying upon the ground.

After duly considering this problem and as a result of such consideration, I have succeeded in producing wheel attachments for a sled or the like, making it available for use as an all-year toy or vehicle, as will now be more fully explained.

Hence, in the practice of my invention, and referring again to the drawing, a sled, generally indicated at 5, which may be of any type so long as it is provided with runners, has a more or less conventional top or seat portion generally indicated at 6 mounted upon cross-pieces 7, 7 which in turn are provided with downwardly-extending side frames 8, 8. Upon the lower ends of the frames 8, 8 are secured a pair of substantially parallel runners 9, 9 which are bent arcuately upward at the front ends 10, 10 and secured to a cross-piece 11. The construction just described is rather conventional and simply one of several types of sleds which may be used, but merely described in order to provide a basis for the invention which will now be set forth in detail.

Upon both runners 9, 9 are transversely disposed a pair of shafts 12, 12 upon the outer ends of which are mounted wheels 13, 13 with a pair of washers 14, 15 disposed at the sides of each wheel and a cotter pin 16 extending through the outer end of each shaft exteriorly of the collar 15 thereon to retain the wheels 13 assembled upon the shaft involved.

Within the wheels 13 at each end of each shaft 12 and preferably within the washer or collar 14 thereon is mounted a yoke member generally indicated at 17 substantially of U-shaped flat strip metal with the two arms or walls 18, 18 thereof provided with a pair of registering holes 19 through which the shaft 12 extends in each case. In the lower transverse member 20 of each yoke member a thumb screw or bolt 21 extends with the threaded shank 22 thereof threadedly through an aperture that projects upwardly with its upper end 24 bearing against the bottom of runner 9 in such fashion that the yoke member is drawn downward so that the holes 19 in the yoke arms 18, 18 bear down heavily upon the shaft 12, while the upper end 24 of thumb screw 23 bears with equal pressure upwardly against the bottom of rail or rudder 9. When it is considered that there are four yoke members thus provided within the four wheels 13, 13, etc., upon the two shafts 12, 12, the latter shafts are held rigidly in place upon runners 9, 9 and the wheels 13 are thus rotatably mounted on the shafts and free to carry the sled 5 inasmuch as the wheels extend below the runners 9 and also below the thumb screws 21. The yoke is preferably made with relatively widewall 18 so that they can encompass the sides of the runner on which each is used, in a tight fit, and thereby form a secure attachment when the thumb screw 22 is screwed up, against the underside of the runner. The U-form yoke allows a certain amount of resiliency to the clamping action induced where it is desirable and enables a single manually placed bolt to take up with stresses and vibrations involved in its practical use. It is without tendency to loosen, which a more rigid attachment would not have.

From the foregoing it is clear that the sled 5 is readily rolled along the ground and down hill when the ground is free from snow in the same manner that the sled itself would travel upon the snow when the ground is covered therewith, and thus the sled as equipped with the present adapters 17 is an all-year sled or toy vehicle and capable of use in all seasons.

Manifestly, variations may be resorted to and parts and features may be modified or used without others within the scope of the appended claims.

Having now fully described my invention, I claim:

1. In combination with a sled structure including a runner for use on icy surfaces, a wheel assembly attachment comprising a U-form yoke having relatively wide walls and joined by a similar transverse member attached thereto, said walls being spaced apart to straddle over said runner in close encompass therewith at a predetermined location thereof, said yoke including a pair of aligned holes in said walls adjacent to the end edges thereof, said yoke also having a screwthreaded aperture in said transverse member aligned with the common axis of said holes substantially at right angles thereto, a thumb nut means screwthreadably operable therein passing from outside of said transverse member to the interior of the yoke to forcibly impress itself against the underside of said runner, an axle passing through said holes in the yoke and projecting on both sides thereof, a wheel rotatable on said axle mounted on one of its projecting portions, said yoke being held to the axle and runner in a position in a plane parallel to that of the runner and so as to position the wheel outside of the sled structure and raise it so the latter will be out of contact with the ground on which the sled is to slidably travel, and the wheel is in rotatable contact with the ground.

2. In combination with a sled structure including a runner for use on icy surfaces, a wheel assembly attachment comprising a U-form yoke having relatively wide walls and joined by a similar transverse member attached thereto, said walls being spaced apart to straddle over said runner in close encompass therewith at a predetermined location thereof, said yoke including a pair of aligned holes in said walls adjacent to the end edges thereof, said yoke also having a screwthreaded aperture in said transverse member aligned with the common axis of said holes substantially at right angles thereto, a thumb nut means screwthreadably operable therein passing from outside of said transverse member to the interior of the yoke to forcibly impress itself against the underside of said runner, an axle passing through said holes in the yoke and projecting on both sides thereof, a wheel rotatable on said axle mounted on one of its projecting portions, said yoke being held to the axle and runner in a position in a plane parallel to that of the runner and so as to position the wheel outside of the sled structure and raise it so the latter will be out of contact with the ground on which the sled is to slidably travel, and the wheel is in rotatable contact with the ground, said assembly including a second yoke and wheel of similar construction, placeable on a second runner on said sled to support the said axle at the end opposite to that which the first mentioned yoke supports, said yokes being of a form providing a limited resiliency and rigidly attachable to said runners against lateral tilting.

JOSEPH C. PINTAK.

REFERENCES CITED

The following references are of record in the file of this patent:

UNITED STATES PATENTS

| Number | Name | Date |
|---|---|---|
| 946,842 | Haas | Jan. 18, 1910 |
| 1,401,085 | Kilmer | Dec. 20, 1921 |
| 1,412,413 | Meyer | Apr. 11, 1922 |